July 5, 1949.  G. E. WHITE  2,474,875
PULSE-ECHO VOLUME COMPENSATING SYSTEM
Filed Jan. 22, 1943  2 Sheets-Sheet 1
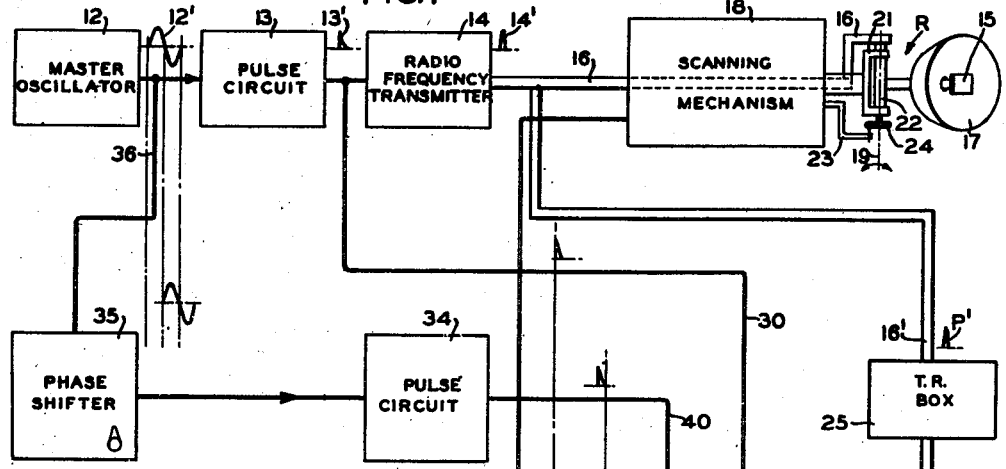
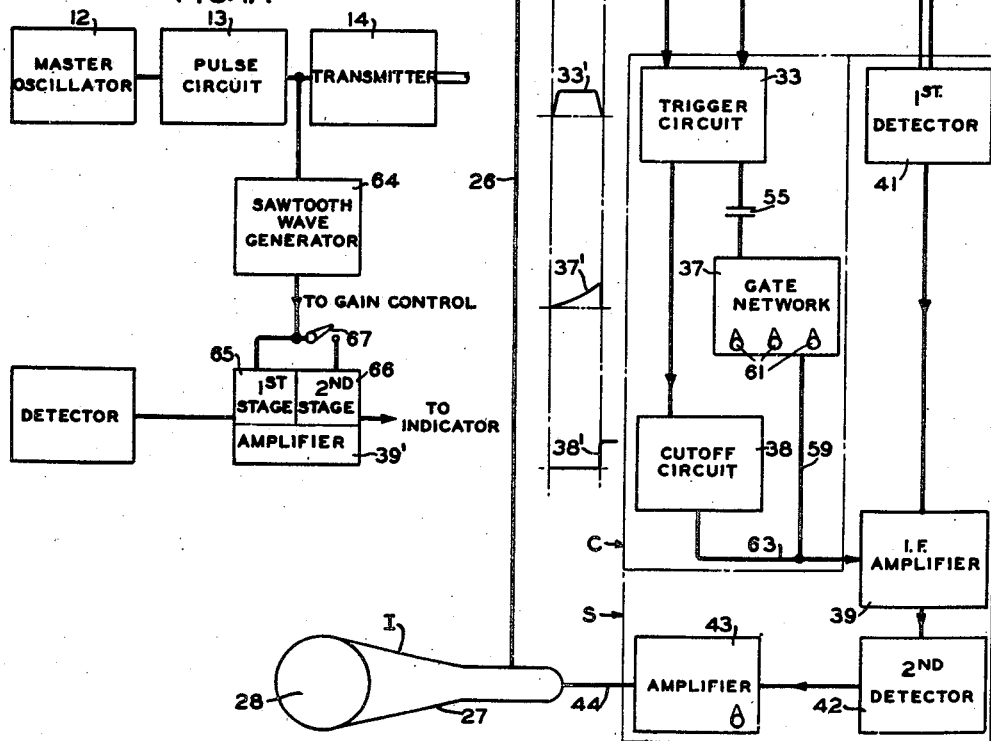
INVENTOR
G. E. WHITE
BY
ATTORNEY July 5, 1949.                G. E. WHITE                2,474,875
PULSE-ECHO VOLUME COMPENSATING SYSTEM
Filed Jan. 22, 1943                          2 Sheets-Sheet 2

INVENTOR
G. E. WHITE
BY Paul B. Hunter
ATTORNEY

Patented July 5, 1949

2,474,875

UNITED STATES PATENT OFFICE 2,474,875

PULSE ECHO VOLUME COMPENSATING SYSTEM

Gifford E. White, Hempstead, N. Y., assignor to The Sperry Corporation, a corporation of Delaware Application January 22, 1943, Serial No. 473,258

4 Claims. (Cl. 343—13)

This invention relates to radio object-detecting systems and more particularly to such systems wherein signals derived from electromagnetic waves reflected from irradiated objects are compensated for range attenuation.

It is standard practice in detecting remote objects to irradiate successive portions of the field of observation by sweeping a lobe of pulsating electromagnetic energy recurrently along a regular path covering the field, and to form images on the screen of a cathode ray tube with an electron stream deflected in synchronism with the motion of the lobe, while controlling the intensity of the stream or locating the image of the object in response to signals derived from reflected pulses. In order to minimize interference in the pulse receiver from noise effects and from direct signals from the transmitter, it is customary to block the receiver except for a short gating period following the transmission of each pulse, thereby rendering the receiver responsive to reflected pulses during only a brief interval corresponding to the travel time for the pulses to travel to and from objects within the operating range of the device. Receiver blocking may be accomplished conveniently by biasing one of the receiving tubes to cutoff, as by applying a suitable negative potential to one of the grids thereof. The receiver may be gated, or rendered operative by neutralizing the blocking bias voltage, usually by applying a square wave triggered in synchronism with the transmitted pulse so as to permit reception of reflected pulses for an interval whose duration depends upon the duration of the neutralizing square wave or gate.

With the foregoing conventional system, signals derived from all reflected pulses are amplified substantially equally, so that reflections from near objects produce strong signals while those from distant objects produce weak signals, since the reflections attenuate as a function of the range of the object from the transmitter-receiver. Hence when the receiving apparatus is adjusted for normal reception with reflections of at least moderate strength, the response may be inadequate for weaker reflections, so that some means is desirable for compensating the weaker signals for range attenuation. If an attempt is made to adjust the apparatus for the reception of weaker reflections, as by advancing the gain, the noise level increases to an undesirable point, and the strong signals are correspondingly amplified unnecessarily, maintaining a wide range between the amplitude of powerful and weak signals, and hence providing a poor indication of objects on the cathode ray tube or other indicating instrument.

Automatic volume control systems which regulate the gain according to the amplitude of a succession of signals are unsuitable to the purpose because they are not operative on individual signals as is required in the present case, and even if they were, would not distinguish between compensation required for range attenuation and compensation for signals that are weak from other causes.

Accordingly, the present invention is concerned with a variable gain control for a reflected pulse receiver operative over a given range recurrently, in synchronism with the pulse rate, to provide selective amplification of the received signals according to the time interval between transmission and reception of pulses.

The principal objects of the present invention are: to provide methods of and apparatus for periodically varying the gain of a radio pulse receiver; to provide a system for compensating reflected radio pulses for attenuation due to the distance or range traversed by the pulses; to provide a pulse transmitter and receiver having gain control means triggered coincidentally with each pulse transmission for progressively increasing the amplification as a function of time during the ensuing interval devoted to the reception of reflected pulses; and to provide periodic amplification in a pulse receiver as a parabolic or other function of the time required for the pulse to travel to and from an irradiated object. These and other objects will become more readily apparent from the following description and from the accompanying drawings, wherein, Fig. 1 is a block diagram of a radio pulse transmitting and receiving system incorporating features of the present invention.

Fig. 1A is a block diagram of a portion of Fig. 1 disclosing a modified arrangement of parts.

Figure 2:
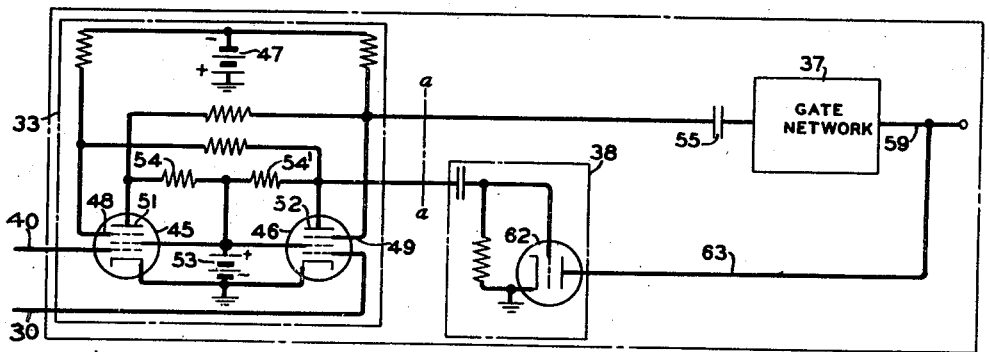
Fig. 2 is a combined wiring diagram and block diagram of the signal compensating circuit forming a part of Fig. 1.

If a selective radio beam is projected upon a target small with respect to the effective beam width, the target will receive a total amount of energy that varies inversely as the square of the distance between the radiator and target. The target radiates some of this energy back to the transmitter where it can be received and detected. This re-radiated energy also attenuates inversely as the square of the distance, so that the total power received back at the transmitting point varies inversely as the fourth power of the distance, or range, all else being constant, resulting in a signal whose amplitude varies inversely as the square of that distance, as graphically indicated in Fig. 5. By amplifying the signals selectively, so that later-received and accordingly the weaker signals of each cycle are amplified to a greater degree, attenuation resulting from range effects may be partially or fully compensated for, as will appear.

Although the invention is adapted to a wide range of uses, it has been shown in the appended drawings as applied to a pulse-type radio object-detecting system merely to illustrate a typical embodiment. Hence although reference is made to radio frequency pulses, it will be understood that the principles are applicable as well to other types of energy, the intensity of which falls off as a function of the range over which the energy travels. Likewise, the invention is applicable to radio systems generally, whether the energy is radiated intermittently in the form of pulses or modulated in any convenient manner. The same reference characters are used throughout the several views to designate corresponding parts.

As shown in Fig. 1, a typical apparatus may comprise a radiation system R adapted to direct energy pulses or waves along successive portions of a field of observation so that the pulses or waves might be reflected by any intercepting objects. Signal forming means S are adapted to receive the reflected pulses or waves and to derive signals therefrom for use with an indicator I such as cathode ray tube. A signal compensator C selectively amplifies the received signals, so that the weaker signals formed by reflections from a distant object are amplified to a greater extent than those formed by reflections from a nearby object. Accordingly, the reflections may be compensated partly or fully for range attenuation, and the useful range of the device thereby may be extended.

The radiation system R of Fig. 1 comprises a radiant energy generator and a scanning device for directing a beam of energy along successive portions of the field. With the specific arrangement disclosed in Fig. 1, the generating system may comprise a master oscillator 12 operating at the desired pulsing frequency required to produce the detail wanted in the indicator I. Sinusoidal waves 12' from the oscillator 12 are fed to a pulse circuit 13 which is provided with conventional wave shaping means adapted to form a pulse 13' having a sharp wave front. The pulse 13' is cooperative with a radio frequency transmitter 14 to form radio pulses 14' having a duration of the order of one microsecond, and having a high carrier frequency, for example, $3 \times 10^9$ oscillations per second. The radio pulses are connected to an antenna 15 as by means of a waveguide or other suitable conductor 16. The antenna 15 includes a concave or other reflector 17 adapted to collimate the energy or direct it into a suitable beam for radiation into space. A scanning mechanism 18 may sweep the beam angularly to irradiate the desired field.

It is immaterial whether the beam is oscillated or whether it is rotated about one or more axes, so long as the beam periodically covers each portion of the field to be observed. Fig. 1 diagrammatically discloses scanting mechanism 18 adapted to produce both oscillatory and rotary motion about separate axes. The mechanism 18 may comprise a motor and transmission mechanism of conventional design capable of rotating or spinning the antenna system about the axis of the waveguide 16 at a rate of the order of 1200 R. P. M. while oscillating or nodding the antenna about a transverse axis 19, for example, at a low rate of the order of one oscillation per second. As diagrammatically shown in Fig. 1, the antenna mount may comprise a yoke 21 within which an antenna support 22 is oscillatable about axis 19, as indicated by the arrows. A connecting rod 23 may extend from the scanning mechanism housing to a crank 24 so as to nod the antenna. Accordingly with the scanning mechanism 18, the beam radiated from the reflector 17 defines a cone of constantly changing apex angle, the axis of the beam describing a cone of revolution, the slenderness of which cone changes as the reflector nods about axis 19.

Energy pulses P' reflected from a remote object or target are collected by the antenna 15 and are conducted through a waveguide or similar conduit 16' to the receiver or signal forming means S. A T-R box or voltage limiter 25 is interposed in the waveguide 16' to protect the receiver S from the harmful effects of energy transmitted directly from the transmitter 14. The limiter 25 may comprise a gaseous discharge device which flashes over when excited by the directly transmitted energy and thereby forms a high impedance junction between the guide 16 and the guide 16'. The limiter, however, is operable to pass low intensity reflected energy to the receiver without substantial loss.

The signals derived from the reflected pulses are employed to operate some form of indicator, suitably a cathode ray picture tube 27 having an electron stream deflected about a path corresponding with the motion of the beam of energy from the antenna 15, as controlled by connection 26. The scanning mechanism 18 may be provided with suitable control means adapted to govern the deflecting elements of the cathode ray tube 27. For example, it is conventional to extend the connection 26 from the respective deflecting plates of the tube 27 to a two-phase generator operated by and having a frequency synchronized with the spinning motion of the antenna 15, and having an amplitude varying periodically from full positive value to full negative value at a rate coinciding with the nodding frequency. In this way, the motion of the electron stream is synchronized with the motion of the energy beam, and the stream may be intensified or keyed on in response to the signals formed from the reflected energy by the receiver S. The momentary energization of the electron stream forms a bright spot or image on the screen 28 in a position corresponding to the orientation of the target with respect to the radiation system R.

Figure 5:
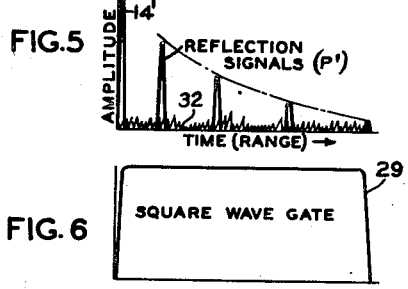
Figs. 5 through 11 are graphic representations of the signals and of various gating waves plotted with signal amplitude as ordinates, and time or range as abscissae.
Figure 6:
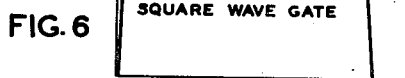

In order to provide maximum signal to noise ratio throughout the operation, it is customary to block the receiver except for the interval or active portion of each cycle following the transmission of a pulse during which interval reflections are expected to appear. The receiver may be rendered momentarily operative by neutralizing the blocking voltage as by means of a square wave or gating pulse 29 of the general type shown in Fig. 6. The square waves may be formed recurrently in synchronism with the oscillations 12', phase displaced relative thereto so as to render the receiver operative immediately following the transmission of each pulse 14'. The duration of the square wave is determined by operating conditions, and specifically by the time interval required for the transmitted pulse to travel to the most remote target and return to the receiving equipment. The use of a square wave gate alone has the disadvantage, however, of rendering the receiver equally responsive to all reflected pulses, so that weak signals received at an appreciable interval after the transmitted pulse as indicated in Fig. 5 would form weak responses in the indicator I. It is desirable to maintain all signals at the same general amplitude so that a more uniform response will be obtained with the indicator I, assuming constant reflectivity characteristics in the targets. This cannot be done simply by advancing the gain because it preserves the ration between strong and weak signals, and at the same time increases the noise level to an undesirable point.

The difficulty may be overcome by providing a variable gain control that is operative over each active portion of the cycle, as depicted in Figs. 5 to 11, to compensate the signals as an inverse linear or other function of the attenuation caused by distance or range. In Fig. 5, the attenuation has been shown as a parabolic function of time, so that the gain during each cycle likewise may be varied as a parabolic function of time but inversely as the signals attenuate. By fully compensating for the attenuation according to the curve 31 of Fig. 7 the signals may be restored to a condition of substantially equal amplitude as disclosed in Fig. 8. In this manner the average level of the noise 32 is minimized and is materially amplified only at the end of each cycle as shown.

Apparatus of the type shown in Figs. 1 and 1A may be used to obtain the desired variable gain during each cycle. As shown in Fig. 1, use may be made of a signal compensator C comprising a trigger circuit 33 adapted to control the turning on and shutting off of the variable gain circuit. The first or actuating pulses for the trigger circuit are derived from the oscillator 12 and pulse circuit 13. The pulses 13' may be used directly to initiate the gain cycle and may be applied to the trigger circuit by extending a connection 30 from the pulse circuit 13 to the trigger circuit 33. The second or terminating pulses occur at the end of the time interval reserved for the reception of reflected energy and are conducted to the trigger circuit 33 through wire 40 from a pulse circuit 34, energized by a phase shifter 35 receiving signals from the oscillator 12 through connection 36. The phase shifter 35 is adjusted to delay the formation of pulses from the circuit 34 by the desired interval.

Figure 7:

The trigger circuit 33 is actuated by the first pulse to form a substantially square wave 33' as shown in Fig. 1 which may unblock the receiver, if a blocking bias is used, and which may be fed periodically to a gate network 37, of a type to be more fully described, to produce a gain-controlling signal 37' of the general shape shown in Fig. 1, having the general shape of the curve 31 of Fig. 7. The network 37 is discharged substantially instantaneously by means of a cut-off circuit 38 which produces the wave 38' as shown in Fig. 1. The output of the compensator C may be fed to the receiver S, to control the gain according to the shape of the wave 37'. As shown in Fig. 1 the control may be exercised on an intermediate frequency amplifier 39, located between the first detector 41 and second detector 42. An amplifier 43 may be employed to control the amplitude of the receiver signals, and the signals themselves may be impressed on the indicator I by means of connection 44.

The compensator C is disclosed more completely in Fig. 2. The circuit 33 is disclosed as a conventional Eccles-Jordan trigger circuit of a type employing pentode tubes 45 and 46. A suitable battery 47 may be utilized to impress a negative bias on the suppressor grids 48 and 49 respectively, each suppressor grid being additionally influenced by the voltage on the plate of the remaining tube. The plate elements 51 and 52 are adapted to pass current from a battery 53 whenever the respective tubes are conductive. The trigger circuit is controlled by pulses received through connections 30 and 40 from the pulse circuits 13 and 34 respectively. Assuming the tube 45 to be conductive, a trigger pulse received from the circuit 13 substantially in synchronism with the radiated pulse 14' applies a positive voltage to the control grid of the pentode 46, rendering the tube conductive. Current thereupon flows from the battery 53 through load resistor 54' causing a drop in the voltage applied to plate 52, and hence cooperating with battery 47 to apply increased negative voltage to the suppressor 48 of the tube 45. The tube 45 thereby becomes less conductive and the reduced voltage drop across load resistor 54 tends to raise the plate voltage of the tube 45 and accordingly to render the suppressor grid 49 less negative, contributing to the conductivity of tube 46. The changeover progresses, until at the end of a brief instant, tube 46 becomes fully conductive and tube 45 becomes non-conductive. The polarity of the suppressor 49 varies during the changeover according to the wave shape 29 of Fig. 6 since the voltage reaches a predetermined steady value almost instantly. The potential of the suppressor grid 49 is applied through a large capacity coupling condenser 55 to the gate network 37 which comprises suitable impedances adapted to build up a compensating gain pulse progressively with time according to the general shape of the curve 31 of Fig. 7 or according to any other desired shape, as will appear. The components of the network 37 may be determined by network synthesis according to the shape of curve desired.

Figure 3:
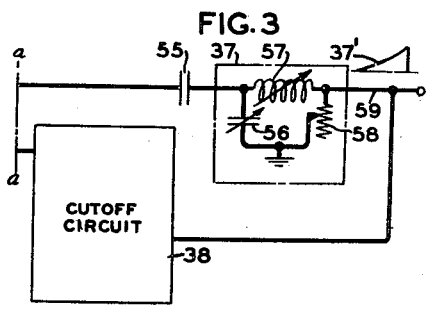
Figs. 3 and 4 are schematic diagrams of varying forms of gate networks that may be substituted for the portion of Fig. 2 to the right of the line a—a.

Fig. 3 discloses a network for this purpose which has been found successful in producing a compensating wave of generally parabolic shape, that is a wave whose amplitude increases as a power function of time. The gate network 37 may comprise a capacitor 56 extending between the condenser 55 and ground, with an inductor 57 and resistor 58 in series shunting the capacitor 56. The output of the network 37 comprises the signal-compensating or variable-gain gating pulse 37' which may be applied through connection 59 to control the gain of the amplifier 39 as previously pointed out.

Figure 4:
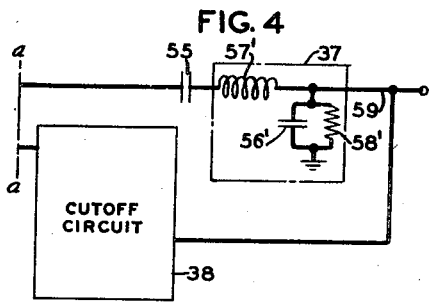

An alternative gate network 37 is disclosed in Fig. 4 wherein an inductor 57' is connected in series between coupling condenser 55 and one end of a parallel circuit comprising a capacitor 56' and a resistor 58', the opposite end of which is grounded. The reactors and resistors of Figs. 3 and 4 may be variable to provide variable control of the circuit constants, as by individual knobs 61 as shown in Fig. 1.

At the end of the interval during which reflections are to be received, it is desirable to have the gain restored quickly to its initial condition without awaiting for the normal decay that characterizes a storage circuit. This may be accomplished with the cut-off circuit 38, which may be triggered by the second triggering pulse received through wire 40 at a predetermined time following the transmission of each pulse, and at a time corresponding with the end of the square wave or gate 29. The second triggering pulse positively charges the control grid of the tube 45 and renders that tube conductive, while tube 46 becomes non-conductive. The potential of the plate element 52 changes meanwhile, and applies a corresponding positive pulse on the grid circuit of a clipper tube 62. The tube 62 may comprise a thyratron or other similar tube capable of being biased suddenly from a non-conducting to a fully conducting condition. Accordingly at the moment tube 45 is rendered conductive, the tube 62 also may be rendered conductive, and the charge on the network 37 may be dissipated instantly through connection 63. Although the operation of the trigger circuit 33 has been described in terms of a positive pulse applied to the non-conducting tube, it will be understood that under certain conditions of operation, as when the suppressor bias is large, it may be desirable to trigger the circuit by removing the positive potential from the conducting tube.

The type of gain control exercised by the pulse 37' is dependent largely upon the manner in which the pulse 37' cooperates with the amplifier 39. Since the gain of a pentode amplifier tube is substantially a linear function of the screen voltage, the gain of the amplifier may be made to follow the pattern of the wave 37' by applying this wave to the screen grid. Accordingly if the amplitude of wave 37' represents a power function of time, the gain of the amplifier may be varied in a similar manner. It is to be understood that throughout this description a power function is to be construed as including a power series of one or more terms. Therefore, if the function is linear, the second and ensuing terms may have a coefficient of zero, while if the function is parabolic the third and ensuing terms may have a coefficient of zero.

Figure 8:
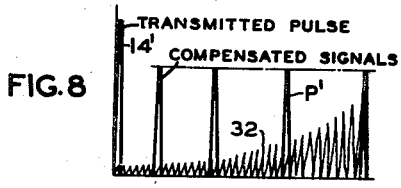

If proper compensation is made, the amplitude of the corrected pulses P' may be brought to substantially a uniform level as shown in Fig. 8. It may be desirable, however, to so compensate the reflected pulses that the amplitudes differ slightly as a function of time, whereby signals denoting remote objects will be slightly weaker than those denoting near objects, and accordingly some slight distinction might be produced on the indicator between near and distant objects without unduly detracting from the range of the device.

The type of compensation required varies according to the nature of the reflecting target. With a target small relative to the effective beam width, the amplitude of the reflected wave varies inversely as substantially the square of distance. With other targets as linear objects, such as shore lines, the amplitude may vary inversely as roughly the three-halves power, while with large objects reflecting the energy at substantially all points, the amplitude may vary more nearly as an inverse linear function of range. Hence the nature of the gain required to compensate for range attenuation is correlated with the type of target irradiated. The compensation may be controlled to some extent by adjustment of the circuit constants in the gate network 37 of Figs. 2, 3, and 4, through the range of from zero to maximum.

Figure 10:
Figure 11:
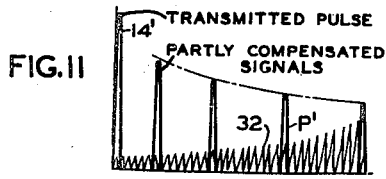

In this manner, the signals may be compensated according to an empirical correction curve of the general type shown in Fig. 10, either to provide complete compensation under a special set of conditions, or partial compensation for the ordinary conditions shown in Fig. 5, in which latter event the amplitude of the corrected signals or pulses P' will fall off slightly with range as indicated in Fig. 11.

Instead of the network 37, use may be made of a sawtooth wave generator or other like mechanism having a relaxation or other type oscillator, capable of exerting the necessary corrective influence on the gain of the amplifying system periodically with the transmission of pulses. A linear correction of the amplitude according to the wave form disclosed in Fig. 9, may be obtained with a linear sawtooth wave generator 64, disclosed in Fig. 1A. Substantially linear correction of signal amplitudes with time may be obtained by applying the saw tooth wave to the screen grid of a pentode or tetrode amplifying tube of the first stage 65 of amplifier 39', though a similar control may be obtained by applying the wave to the amplifier in any manner effective to vary the gain. It will be apparent that correction other than linear may be obtained by varying the shape of the sawtooth wave.

Figure 9:
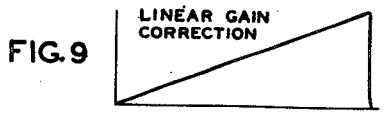

A linear sawtooth wave of the type shown in Fig. 9 may be used to provide parabolic increase of gain with time by applying the wave to the screens of two or more cascaded stages of amplification. As shown in Fig. 1A, the output of the generator 64 may be applied to the second stage 66 of amplifier 39', as well as to the first stage 65, merely by closing a switch 67. The output of the amplifier connects with a suitable indicator in the same general manner as shown for the amplifier 39 in Fig. 1. The manner in which the indicator I is controlled by the received and compensated signals depends upon the type of indicator used, and the nature of the indication desired. With a cathode ray tube 27 having an electron stream deflected in synchronism with the motion of the radio beam, the connection 44 may extend to the intensity grid to vary the intensity of the spot formed on the screen 28. Where the screen 28 is used to indicate range as a distance along a trace formed by a linearly swept electron stream, proper indication may be produced by applying the received signals to the appropriate deflecting elements of the tube 27.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

I claim:

1. Radio transmitting and receiving apparatus comprising means for radiating periodic pulses into space, means for deriving signals from radio pulses reflected from irradiated objects, variable gain amplifier means for amplifying said signals, and gain control means comprising electron discharge means for generating a substantially rectangular periodic wave synchronized with said radiated pulses, wave shaping means deforming said rectangular wave for increasing the gain of said amplifier means as a function of time, and means for limiting the duration of the deformed wave to a desired portion of the period between said radiated pulses.

2. Radio transmitting and receiving apparatus comprising means for radiating periodic pulses into space, means for deriving signals from radio pulses reflected from irradiated objects, variable gain amplifier means for amplifying said signals, and gain control means comprising electron discharge means for generating a substantially rectangular periodic wave synchronized with said radiated pulses, wave shaping means deforming said rectangular wave for increasing the gain of said amplifier means as a function of time, and means for limiting the duration of the deformed wave to that of said rectangular wave.

3. In apparatus compensating for range attenuation of pulses of radio energy delivered to a receiver during a predetermined receiving cycle, means progressively increasing the gain of said receiver from zero to a maximum during only a portion of said cycle, means for varying the extent of said portion and means for varying the rate of increase of said gain within said portion of said cycle.

4. In radar apparatus including pulse transmitter means for emitting brief high intensity pulses of radio frequency energy at a predetermined repetition rate and a receiver for receiving pulse energy components reflected from objects and delayed according to the object distances, apparatus for automatically regulating the gain of the receiver comprising means synchronized with said transmitter for producing recurrent gain increase control waves, means responsive thereto for smoothly increasing the gain of said receiver from a low gain condition at the moments of emitting said pulses to an appreciably higher gain, and means for controlling both the rate of increase of said gain and the duration of time after each emitted pulse during which the gain is increased, the duration of the gain increase after each emitted pulse being only a portion of the time interval between emitted pulses.

GIFFORD E. WHITE.

REFERENCES CITED

The following references are of record in the file of this patent:

UNITED STATES PATENTS

| Number | Name | Date |
|---|---|---|
| 1,924,156 | Hart | Aug. 29, 1933 |
| 2,009,459 | Turner | July 30, 1935 |
| 2,167,492 | Sproule | July 25, 1939 |
| 2,225,046 | Hunter | Dec. 17, 1940 |
| 2,227,598 | Lyman et al. | Jan. 7, 1941 |
| 2,329,570 | Wellenstein et al. | Sept. 14, 1943 |

FOREIGN PATENTS

| Number | Country | Date |
|---|---|---|
| 113,233 | Australia | June 2, 1941 |
| 520,778 | Great Britain | May 3, 1940 |